United States Patent Office 2,906,598
Patented Sept. 29, 1959

2,906,598

PREPARATION OF HIGH DENSITY $UO_2$

John M. Googin, Oak Ridge, Tenn., assignor to the United States of America as represented by the United States Atomic Energy Commission No Drawing. Application April 14, 1958
Serial No. 728,494

8 Claims. (Cl. 23—14.5)

My invention relates to a method for the preparation of $UO_2$ particles and more particularly to a method for the preparation of $UO_2$ particles suitable for use in a neutronic reactor.

The uranium used in a reactor may be in the elemental state or may be combined with other elements. Because of its desirable physical, chemical and neutronic properties one useful uranium compound is $UO_2$. In one method of preparing fuel elements for nuclear reactors $UO_2$ particles in a selected size range are mixed with a diluent material, the resulting mixture is loaded into a die cavity and pressed, and the resulting pressed member is completely jacketed with a corrosion-resistant material. The jacketing or cladding may be accomplished by hot-rolling the core-compact between plates of a cladding material in such a manner as to form a metallurgically-bonded sandwich. A more detailed description of the manner of preparing fuel plates and fuel elements which may be made from fuel plates may be found in the Proceedings of the International Conference on the Peaceful Uses of Atomic Energy, vol. 9, p. 203, "MTR Type Fuel Elements." In another method of preparing fuel elements for neutronic reactors $UO_2$ particles are fed to a jacketing tube and the tube containing the $UO_2$ is hot-swaged to the final dimensions.

The $UO_2$ particles used in fuel elements as illustrated by the types described above should be free-flowing, inert, and have a high bulk density and a low surface area. The tap density of the majority of the prior art powders, such as those made by the hydrogen reduction of $UO_3$, ranged from approximately 2 to approximately 4, and some of the powders had tap densities ranging from 5.0 to 5.5.

The tap density, a measure of the bulk specific gravity of the solids, is the density of the solids in a thoroughly settled condition wherein the settling is achieved by tapping the sides of a container holding the solids. One suitable procedure for determining tap density is set forth in ASTM Designation: E12-27.

The design of many types of reactors requires the use of uranium enriched in the U-235 isotope. The usual feed material in a process for the preparation of $UO_2$ is $UF_6$ since $UF_6$ can be withdrawn from a diffusion cascade in a relatively pure state. However, in the prior art there has been no suitable method for the preparation of $UO_2$ particles using $UF_6$ as a source of uranium and wherein the resulting $UO_2$ had the desired properties including the properties of high density, low surface area, and low chemical reactivity.

One object of my invention is to provide a method of producing $UO_2$ particles suitable for use in a neutronic reactor.

Another object is to provide a method of producing $UO_2$ particles having a high density, low surface area, and low chemical reactivity.

Another object is to provide a method for producing $UO_2$ from $UF_6$.

Other objects will become apparent from the following detailed description and the claims appended thereto.

In accordance with my invention ammonium hydroxide is added to an aqueous solution of $UO_2F_2$, the resulting precipitate is separated from the mother liquor, the separated precipitate is calcined to $U_3O_8$, said $U_3O_8$ is contacted with a reducing atmosphere comprised of carbon monoxide and carbon dioxide at an elevated temperature, and the resulting $UO_2$ particles are recovered.

The $UO_2$ particles which are made by my process are granular, free flowing, inert, and have a high density and low surface area. Typically the particles have a tap density of approximately 6.0 to 6.5 grams per cubic centimeter and an area of approximately 0.03 square meter per gram. In view of their high density and low surface area the $UO_2$ particles made by my process are particularly well-suited for use in nuclear reactor fuel elements.

In carrying out my invention, an aqueous solution containing $UO_2F_2$ and HF is contacted with ammonium hydroxide whereby a precipitate which is a mixture of uranates and ammonium uranyl fluoride is formed. I have found that the conditions in the precipitation step must be closely controlled. The precipitate formed in this step must be gelatinous in order for the ultimate $UO_2$ particles to have the desired properties. If the precipitate is not gelatinous the resulting product is not a free-flowing powder but is a brick-like mass. In order to obtain a gelatinous precipitate the $UO_2F_2$ solution must be concentrated, a $UO_2F_2$ solution containing from approximately 5 percent uranium to the concentration at which the solution is saturated in uranium being suitable and a concentration of approximately 16 percent being preferred.

One suitable way of preparing $UO_2F_2$ is to react $UF_6$ with water. This is a particularly desirable method if uranium enriched in the $U^{235}$ isotope is to be used. When $UF_6$ is contacted with water, a solution of $UO_2F_2$ in aqueous HF is formed. The $UF_6$ reacts vigorously with water; the method of carrying out this step is not critical, and the $UF_6$ may be added to the water as a solid, liquid, or as a gas. One convenient way of forming the $UO_2F_2$ is to introduce vaporized $UF_6$ and water into a mixing nozzle. If this method is used the water should be held at an elevated temperature in order to prevent plugging of the nozzle. External heating means are needed to start the process, but the exothermic nature of the reaction between $UF_6$ and water makes it possible to operate the system with a minimum of externally-applied heat once the reaction between $UF_6$ and water has started. The concentration of $UO_2F_2$ can be suitably adjusted by recycling a portion of the $UO_2F_2$ solution to the mixing nozzle and governing the rate at which water is added to the system.

The concentration of the ammonium hydroxide used must be at least approximately 10 molar, and approximately 14 molar is preferred. I have found that the quantity of ammonium hydroxide used is critical. The ammonium hydroxide must be in excess, and the quantity used must be approximately 5 to 7 times the stoichiometric amount required for the uranium and the HF in the feed solution.

The temperature at which the precipitation is carried out is not critical and a temperature of approximately 20° C. to 30° C. is suitable.

In the preferred manner of carrying out my process the precipitate is aged for a short time. While aging of the precipitate is not necessary to obtain particles of the desired characteristics, aging will reduce the amount of uranium left in the filtrate. For instance, with an aging time of one-half an hour less than 50 milligrams of uranium per liter is left in the filtrate.

The precipitate is then separated from the supernatant liquid. Conventional liquid-solids separation techniques may be used, and I have found it convenient to use either centrifugation or filtration means.

The equipment used in the formation of $UO_2F_2$, the subsequent precipitations and the filtration may be any conventional equipment which will withstand the corrosive effects of the material handled. I have found polyethylene, graphite, and the vinylidene chloride, trifluorochloroethylene, and tetrafluoroethylene polymers as represented by "Saran," "Kel-F" and "Teflon" respectively to be suitable materials for construction.

After filtration the precipitate is calcined to $U_3O_8$. This may be carried out by placing the precipitate in any conventional calcining device such as a rotary kiln. The calcining is carried out at a temperature of from 700° C. to 800° C. and a temperature of approximately 750° C. is preferred. The resulting $U_3O_8$ is a dense granular material ranging in particle size from less than 325 mesh to above 10 mesh, the major portion of which is in the 100–200 mesh size.

The product of the calcining step is then reduced to $UO_2$. I have found that in order to produce a product having a high density, low surface area, and high chemical stability it is necessary to carry out the reduction using carbon monoxide as a reductant in the presence of carbon dioxide. The reduction is achieved by placing the $U_3O_8$ particles in a vessel, rapidly heating to an elevated temperature, and contacting the heated $U_3O_8$ with a carbon monoxide-carbon dioxide mixture.

While the mechanism of the reduction reaction is not known, at least a low concentration of carbon dioxide must be present in order for the resulting $UO_2$ particles to have the desired physical properties. The concentration of carbon dioxide is not critical but the carbon dioxide must be present in at least the amount which is present in an equilibrium mixture of carbon monoxide and carbon dioxide at the reducing temperature. This is approximately one percent at 1000° C. and decreases with an increase in temperature. While there is no critical upper limit to the concentration of carbon dioxide, and concentrations as high as over 90 percent may be used, high concentrations of carbon dioxide will have the effect of slowing the reaction rate as a result of diluting the reductant.

The reaction vessel may be of any refractory material such as $ZrO_2$ or graphite, but I prefer that it be made of graphite. By using a graphite vessel the need for furnishing the carbon monoxide-carbon dioxide mixture from an external source is obviated, the preferred reducing atmosphere being furnished by the $U_3O_8$ and the carbon in the vessel. At the firing temperature a portion of the $U_3O_8$ is reduced, oxygen is liberated, and the oxygen combines with the carbon of the vessel to give a suitable concentration of carbon monoxide and carbon dioxide. When using a graphite vessel, in the preferred process the $U_3O_8$ is kept under an inert atmosphere until the firing temperature is reached in order to prevent rapid deterioration of the graphite vessel. Any inert gas such as nitrogen or helium is suitable. Of course the exterior of the graphite vessel must be protected from an oxidizing atmosphere at the firing temperature.

If a refractory other than graphite is used for the vessel there is no need to take the precaution of providing an inert atmosphere, and the $U_3O_8$ may be in the reducing atmosphere during the complete firing cycle. It is obvious that in using a refractory other than graphite, some of the advantages of the graphite vessel may be achieved by introducing carbon into the vessel.

The firing temperature for the $U_3O_8$ may suitably range from approximately 1600° C. to 1900° C. and the preferred temperature is approximately 1850° C.

At the firing temperature only a few minutes are required to complete the reduction; however, if the $U_3O_8$ bed is very thick, time has to be allowed for the whole mass to reach the firing temperature.

After reduction the resulting $UO_2$ particles are permitted to cool. The cooling must take place in a nonoxidizing atmosphere.

The cooled particles, which are lightly sintered, are then broken apart and recovered. Conventional crushing equipment may be used to break the sintered particles.

Having thus described my invention, the following example is offered to illustrate my invention in greater detail.

*Example*

$UF_6$ was dissolved in water to give a 0.7 molar uranium solution. To one liter of the resulting solution, cooled to room temperature, was added 2.0 liters of concentrated ammonium hydroxide (14 molar). The reactants were thoroughly mixed and the precipitate which formed was filtered. The filtered solids were placed in a furnace and heated to a temperature of 750° C. That temperature was maintained for a period of 4 hours. The furnace was permitted to cool to room temperature and the solids ($U_3O_8$) were removed. The $U_3O_8$ was placed in a graphite vessel provided with heating means and means for introducing gases. Helium was passed into the vessel at the rate of 3 furnace volumes per minute while the vessel was heated to a temperature of 1000° C. When that temperature was reached the helium was turned off and the heating was continued until a temperature of 1800° C. was reached. The carbon monoxide-carbon dioxide atmosphere which resulted from the interaction of the oxide and the graphite crucible reduced the $U_3O_8$ to $UO_2$. The vessel was permitted to cool to room temperature under helium flow and the $UO_2$ particles were crushed and recovered. The $UO_2$ particles had a tap density of 6.5 and the particle size ranged from 20 mesh to less than 325 mesh with approximately 85 percent lying between 20 mesh and 325 mesh. The surface area was approximately 0.03 square meter per gram.

The above example is illustrative and should not be construed as limiting the scope of my invention. It is apparent that those skilled in the art may make variations without departing from my invention. Therefore, my invention should be limited only as indicated by the appended claims.

Having thus described my invention, I claim:

1. In a process for the preparation of $UO_2$ particles which comprises mixing ammonium hydroxide with an aqueous solution of uranyl fluoride, whereby a uranium-containing precipitate is formed, calcining said precipitate to $U_3O_8$, contacting said $U_3O_8$ with a gaseous reducing agent and recovering the resulting $UO_2$ particles, the improvement which comprises contacting said $U_3O_8$ with a reducing atmosphere comprised of carbon monoxide and carbon dioxide at an elevated temperature.

2. The process of claim 1 wherein the $U_3O_8$ is contacted with the reducing atmosphere at a temperature of approximately 1600° C. to 1900° C.

3. In a process for the preparation of $UO_2$ particles which comprises mixing ammonium hydroxide with an aqueous solution of uranyl fluoride, whereby a uranium-containing precipitate is formed, calcining said precipitate to $U_3O_8$, contacting said $U_3O_8$ with a gaseous reducing agent and recovering the resulting $UO_2$ particles, the improvement which comprises mixing concentrated ammonium hydroxide with an aqueous solution containing a high concentration of uranyl fluoride, said ammonium hydroxide being present in approximately five to seven times the stoichiometric quantity, whereby a uranium-containing precipitate is formed, calcining said precipitate to $U_3O_8$ at a temperature of from approximately 700° C. to 800° C., contacting said $U_3O_8$ with a reducing atmosphere comprised of carbon monoxide in the presence of at least a small quantity of carbon dioxide at an elevated temperature, and recovering the resulting $UO_2$ particles.

4. The process of claim 3 wherein the reducing atmosphere is formed in situ by the reaction between carbon and oxygen.

5. In a process for the preparation of $UO_2$ particles which comprises mixing ammonium hydroxide with an aqueous solution of uranyl fluoride, whereby a uranium-containing precipitate is formed, calcining said precipitate to $U_3O_8$, contacting said $U_3O_8$ with a gaseous reducing agent and recovering the resulting $UO_2$ particles, the improvement which comprises contacting $UF_6$ with water whereby an aqueous solution containing uranyl fluoride is formed, mixing concentrated ammonium hydroxide with said uranyl fluoride solution, said ammonium hydroxide being provided in approximately five to seven times the stoichiometric quantity, whereby a uranium-containing precipitate is formed, calcining said precipitate to $U_3O_8$ at a temperature of from approximately 700° C. to 800° C., placing said $U_3O_8$ in a refractory vessel in the presence of carbon, heating said vessel containing the $U_3O_8$ to a temperature of approximately 1600° C. to 1900° C., whereby a reducing atmosphere comprised of carbon monoxide and carbon dioxide is formed and whereby the $U_3O_8$ is reduced to $UO_2$, cooling said $UO_2$ under an inert atmosphere, and recovering the cooled $UO_2$ particles.

6. In a process for the preparation of $UO_2$ particles which comprises mixing ammonium hydroxide with an aqueous solution of uranyl fluoride, whereby a uranium-containing precipitate is formed, calcining said precipitate to $U_3O_8$, contacting said $U_3O_8$ with a gaseous reducing agent, and recovering the resulting $UO_2$ particles, the improvement which comprises forming the uranium-containing precipitate by mixing concentrated ammonium hydroxide with a concentrated aqueous uranyl fluoride solution, calcining the resulting uranium-containing precipitate to $U_3O_8$, and contacting said $U_3O_8$ with a reducing atmosphere, comprised of carbon monoxide and carbon dioxide, at an elevated temperature.

7. The process of claim 6, wherein the concentrated ammonium hydroxide mixed with the concentrated aqueous uranyl fluoride solution is in the amount of five to seven times the stoichiometric quantity.

8. The process of claim 6, wherein the calcination of the uranium-containing precipitate is carried out at a temperature of 700° C. to 800° C.

References Cited in the file of this patent

UNITED STATES PATENTS

| | | |
|---|---|---|
| 2,466,118 | Miller et al. | Apr. 5, 1949 |
| 2,678,257 | Polissar | May 11, 1954 |

OTHER REFERENCES

Boulle et al.: Compt. Rend., vol. 230, pp. 300–302 (1950).

Katz et al.: "The Chemistry of Uranium," McGraw-Hill Book Co., Inc., N.Y. (1950), page 319.

Stenquist et al.: "Correlation of Surface Characteristics with the Sintering Behavior of Uranium Dioxide Powder," HW–51712, July 25, 1957, pages 5–9. (An A.E.C. Research & Development Report.)